DATA PROCESSING SYSTEM

Filed March 25, 1966 4 Sheets-Sheet 1

INVENTOR
ROGER E. PACKARD

BY Christie, Parker & Hale
ATTORNEYS

INVENTOR
ROGER E. PACKARD
BY
Christie, Parker & Hale
ATTORNEYS

Dec. 1, 1970 R. E. PACKARD 3,544,965

DATA PROCESSING SYSTEM

Filed March 25, 1966 4 Sheets-Sheet 3

INVENTOR
ROGER E. PACKARD

BY

Christie, Parker & Hale
ATTORNEYS

INVENTOR
ROGER E. PACKARD

BY

Christie, Parker & Hale
ATTORNEYS

United States Patent Office 3,544,965
Patented Dec. 1, 1970

3,544,965
DATA PROCESSING SYSTEM

Roger E. Packard, Glendora, Calif., assignor to Burroughs Corporation, Detroit, Mich., a corporation of Michigan Filed Mar. 25, 1966, Ser. No. 537,573
Int. Cl. G06f *9/18*
U.S. Cl. 340—172.5 10 Claims

ABSTRACT OF THE DISCLOSURE

An improved data processing system having a time-shared main memory and providing means for reading a predetermined address of main memory, moving the word stored at this address to a reserved address in memory, and clearing the predetermined address, all within the same memory cycle. Means for automatically restoring information read from the predetermined address are inhibited whenever such a "move and clear" operation is to be performed. In another embodiment, means are provided for reading a predetermined flag-address of main memory, moving the word stored at the flag-address to a reserved address in memory, and storing a flag-value in the flag-address, all during the same memory cycle, thereby making it impossible for more than one processor to read from the flag-address a word other than the flag-value.

This invention relates to high speed digital data processing systems and more particularly to such systems in which a memory unit of the system is simultaneously accessible by a plurality of other units of the system on a time-shared basis.

A word of binary signals may be written into or read from main memory of a digital data processing system during a period of time which is denoted a "memory cycle." Each "memory cycle" ordinarily includes both a "read time" and a "write time" regardless of whether a write or read operation is being performed. In a read operation a word of binary signals is read from main memory during the "read time" of a memory cycle and restoration circuitry is often provided to automatically restore the word into the memory during the "write time" of the memory cycle. The memory cycles of main memories are already extremely fast and are expected to become much faster. Thus, for example, systems with memory cycles on the order of a few microseconds are common and systems with memory cycles of less than a microsecond are already available. It is extremely important that the advantages of such high speed memory cycles not be wasted as a result of delays caused by slower operating units of a data processing system.

The main memory of a data processing system must communicate with one or more processing units of the system and often must communicate with a large number of input-output units as well. While the processing units generally operate at high speed, the input-output units generally operate at a relatively slow speed.

In the past the slow operating speeds of the input-output units have substantially limited the operating speed of the over-all data processing system. This limitation resulted since communications between the main memory unit and each peripheral input-output data handling unit was accomplished by interrupting the transfer of data into and out of the main memory from the processing units and all input-output units other than the particular unit communicating with the main memory. Communication with other units was interrupted until communication with the selected unit was completed. Such communication was not completed until a data record comprising a plurality of words was communicated. Although only one memory cycle is needed to transfer a single word of binary signals into or out of the main memory, a much longer time is necessary for the assembling and transmission of each word by an input unit and for the reception of each word by an output unit. As a result, whenever a data record was communicated between a particular unit and the memory, with communication to other units being interrupted, the high speed potentiality of the main memory was sacrificed to the lower speed of the unit with which it was communicating. Thus, during the time in which the memory was communicating with a particular unit, only a number of memory cycles equal to the number of words transferred would actually be utilized—even though the memory could have utilized a much larger number of memory cycles during this same period of time.

Data processing systems have been devised, however, wherein main memory need not be limited in speed to the speed of a particular unit with which it is communicating. In such systems the main memory is enabled, by means of a time-sharing arrangement, to communicate simultaneously with a plurality of input-output units and processing units. These units transmit a signal to the main memory whenever they are ready to transmit a word to, or to receive a word from, the main memory and priority circuitry within the main memory unit determines which unit will communicate with main memory during the next memory cycle. Thus, for example, main memory may receive a data word from one input device during one memory cycle and a data word from another input device during the immediately succeeding memory cycle. As a result, main memory units in data processing systems employing such time-sharing arrangements may communicate simultaneously with a plurality of input-output devices and with a plurality of processing units. Additionally, such systems may run two or more independent programs simultaneously. An exemplary data processing system with time-shared main memory is described in U.S. Pat. No. 3,200,380 of D. N. MacDonald et al., issued Aug. 10, 1965 and assigned to the assignee of the present application.

Certain problems have arisen, however, as a result of the fact that a plurality of units can simultaneously access main memory of such data processing systems. One type of information word which input-output units write into the main memory is a result descriptor. Result descriptors indicate action taken by a particular input-output device. A result descriptor may, for example, indicate that an operation has been completed and that no error has occurred; alternatively, it may indicate that an error did occur. An extremely important function of a result descriptor is to generate an interrupt signal which indicates that processing by the system should be interrupted in view of a malfunction which has been detected. The processing unit periodically scans the memory addresses where result descriptors are stored. The descriptors stored at these addresses are moved to reserved addresses elsewhere in memory and are subsequently examined. After examination, if operations are proceeding normally, the result descriptor addresses are cleared. A serious problem arises, however, due to the fact that a new result descriptor can be stored at a particular address subsequent to the scanning of that address by the processor but prior to the clearing of the address. As a result, this new result descriptor will be cleared by the subsequent clear operation and will never be detected by the processor. For example, a result descriptor indicating that an input-output output operation has been completed without error may, subsequent to scan and before clear, be replaced by a result descriptor which indicates that an error has in fact occurred. This error signal will go undetected since it will be erased during the succeeding clear operation. Similarly, an interrupt signal stored at a particular address subsequent to the scan of that address but prior to the clearing of that address will likewise be undetected.

An advantage of the present invention is that it eliminates the possibility that a result description may go undetected as a result of being erased during a clear operation occurring prior to its being read.

Another advantage of the present invention is that the need for a separate clear operation is eliminated.

Another problem arises in multi-processor data processing systems in which time-sharing of main memory is employed. In such systems two or more processing units are capable of simultaneously changing informtion comprising a particular record stored in the memory. Since each processor can change the information stored in the record, it is essential that only one processor at a time be able to change the information in a single record. A predetermined address within the record, denoted a "flag-address," is utilized to store a "flag-value" whenever one of the processors is changing information stored in the record. The flag-value is used to indicate to any other processor that the information in the record is presently undergoing a change. In operation, a processor, previous to changing the information stored in a particular record, will read from main memory the word stored in the flag-address of the record and will move this word into a reserved address of memory. Subsequently, the word is examined to determine if it is the flag-value. If the word read from the flag-address is the flag-value then the processor may not change the information stored in the record until a previous processor completes changes which are presently being made. If, on the other hand, the word read from the flag-address is not the flag-value then the processor may commence making changes in the record. When a processor determines that it may proceed to change the record, it first writes the flag-value into the flag-address of the record to prevent another processor from concurrently changing the record. If, however, a second processor reads from the memory the word stored at the flag-address of the record subsequent to the reading of this word by a first processor but prior to the writing of the flag-value into this address by the first processor, both processors will subsequently attempt to change the record simultaneously.

Another advantage of the present invention is that it eliminates the possibility that several processors may concurrently change information stored in the same record in main memory.

A further advantage of the present invention is that it provides an additional time saving over previous systems thereby permitting data processing to be carried out at even higher speeds.

Briefly, the present invention achieves the foregoing advantages by providing means for reading a predetermined address of main memory, moving the word stored at this address to a reserved address in memory, and clearing the predetermined address, all within the same memory cycle. By reading and clearing a predetermined address within a single memory cycle it is impossible for any result descriptor to be stored at the address between the time it is read and the time it is cleared.

Similarly, the present invention provides means for reading a predetermined flag-address of main memory, moving the word stored at the flag-address to a reserved address in memory, and storing a flag-value in the flag-address, all during the same memory cycle. By reading the flag-address and storing a flag-value therein during a single memory cycle it is impossible for more than one processor to read from the flag-address a word other than the flag-value.

Additionally, the need for a separate clear command or a separate "write flag-value" command is eliminated and time is saved which would otherwise be required for the fetching and execution of these commands.

For a complete understanding of the invention, reference should be made to the following drawing in which:

FIG. 3 depicts a schematic block diagram of an embodiment of the present invention utilizing instruction words of the format depicted in FIG. 2A.

Figure 1:
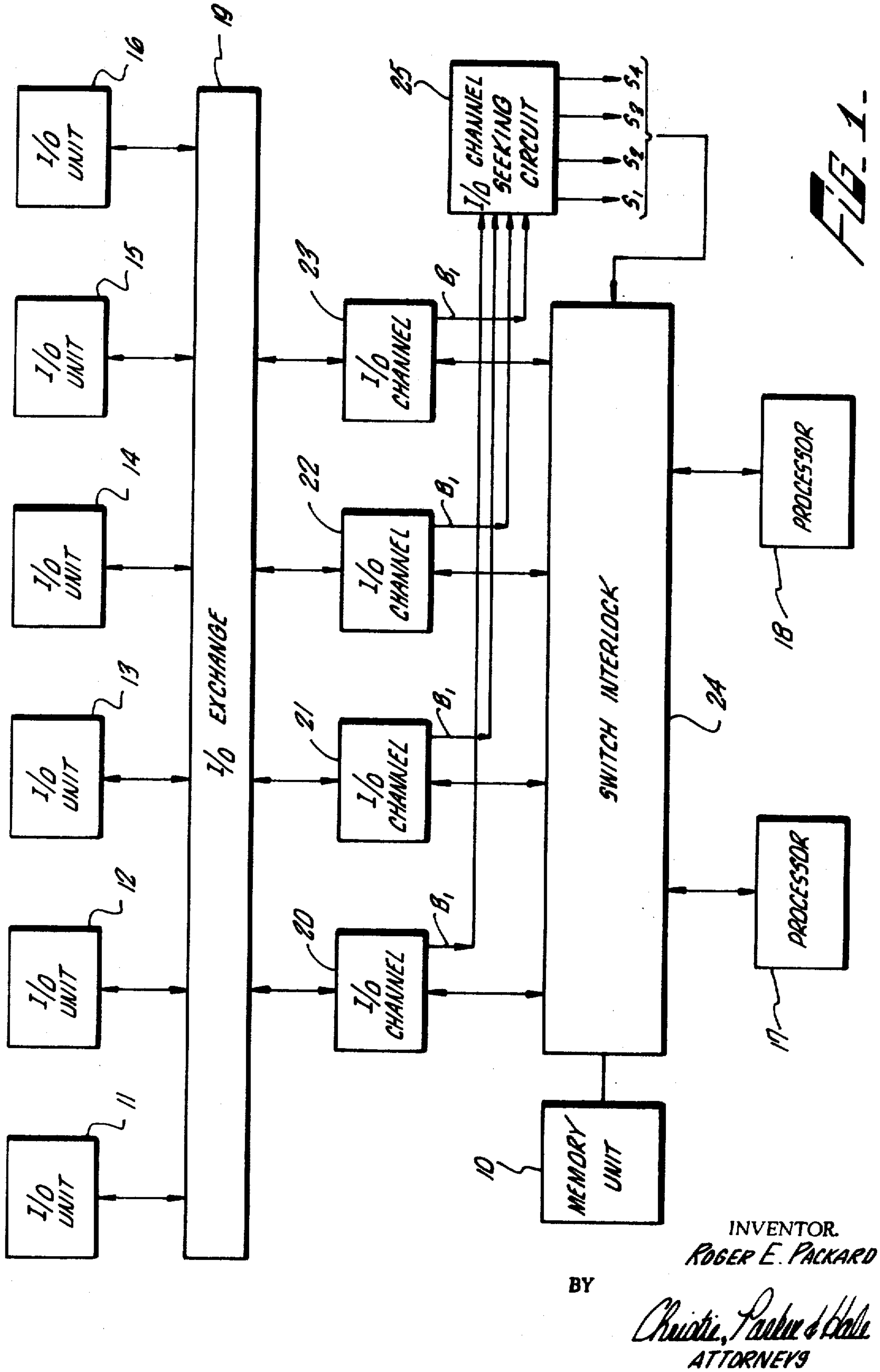
FIG. 1 depicts, in block diagram, a data processing system having a time-shared main memory.

FIG. 1 depicts in block diagram form a data processing system having a time-shared main memory. Such a data processing system is described, for example, in Pat. No. 3,200,380, referred to above which may be considered incorporated herein by this reference. In FIG. 1 a memory unit 10 is depicted which comprises the main memory of the system shown in FIG. 1. Memory unit 10 is time-shared between input-output units 11 through 16 and processor units 17 and 18. The input-output units 11 through 16 may comprise various types of units such as magnetic tape units, card readers, card punch units, keyboard units, message printers and magnetic drums, for example. The input-output units 11 through 16 are connected to a cross-bar type switching circuit or input-output exchange unit 19. The input-output exchange unit 19 is connected to four input-output channels 20 through 23. The input-output exchange 19 may be a standard type of switching circuit such as that used in telephone exchanges in which any one of the input-output channels 20 through 23 may be cross-connected to any one of the input-output units 11 through 16. In addition, the input-output exchange 19 has the ability to connect simultaneously one or more of the input-output channels 20 through 23 to separate ones of the units 11 through 16. A switching interlock circuit 24 is connected to the processors 17 and 18, to the memory unit 10, and to each of the input-output channels 20 through 23. The purpose of the switch interlock is to couple the memory unit 10 to either an input-output channel or to a processor. Each of the input-output channels 20 through 23 has a separate output circuit designated by a symbol $B_1$ which indicates whether that particular input-output channel is presently transferring information between one of the input-output units and the memory unit. When an input-output channel is transferring information, it is considered to be in the "busy state." An input-output channel seeking circuit 25 is connected to the $B_1$ output circuits of each of the input-output channels 20 through 23 and has four separate output circuits designated by the symbols $S_1$ through $S_4$, inclusive, which in turn are connected to the switch interlock 24. The input-output channel seeking circuit 25 is responsive to the signals to the output circuits $B_1$ of the input-output channels 20 through 23 to develop a high potential output signal at one of the output circuits $S_1$ through $S_4$ corresponding to the lowest numbered one of the input-output channels 20 through 23, respectively, which is not busy. For example, when none of the input-output channels is busy, an output signal will be developed at the output circuit $S_1$. When only the input-output channel 20 is busy, a high potential output signal will be developed at the output circuit $S_2$, etc.

As described in more detail in U.S. Pat. No. 3,200,380 referred to hereinabove, the input-output units 11 through 16 and the processors 17 and 18 may make requests for access to the memory unit 10. One or both of the processors 17 and 18 may, for example, request access to the memory unit 10 at a time when one or more of the input-output channels 20 through 23 are simultaneously making requests for access to memory unit 10. Memory unit 10 has a priority circuit which assigns priority to requests for access by the input-output channels and by the processors. Assume, for example, that processor 17 is given priority for access to memory unit 10: the processor then sends an address signal to memory unit 10 which specifies the address where information is stored which is to be transferred to processor 17; memory unit 10 reads this information out of the memory location specified by the address signal and transfers the information back through switch interlock 24 to processor 17; at this point, the memory unit 10 is released and may accept other requests for access. It may be seen that, during one memory cycle of memory unit 10 a particular one of the input-output units or of the processors may be communicating with the memory unit, while during an immediately succeeding memory cycle a different one of the input-output units or of the processors may communicate with the memory unit.

As a result of the time-sharing arrangement of the data processing system shown in FIG. 1, words of signals may be transferred from memory unit 10 to a particular one of the input-output channels intermixed in between transfers of words of signals between memory unit 10 and another input-output channel. The transfer of a word of signals to an input-output channel may also be intermixed between the transfer of words of signals between memory unit 10 and one or both of the processing units 17 and 18. As a result, more than one of the units in the system may be transferring words of signals to memory unit 10 or receiving words of signals from memory unit 10 at the same time. A data processing system having a time-shared main memory such as that shown in FIG. 1 offers great flexibility and enables memory unit 10 to make greater advantage of its high speed operating characteristics.

Figure 2A:
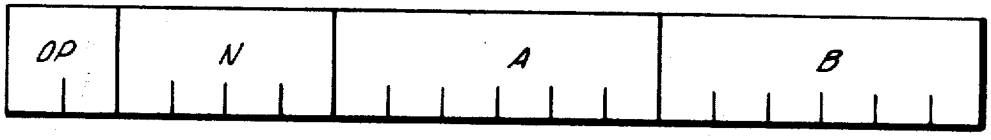
FIGS. 2A, 2B and 2C depict the format of typical instruction words which may be utilized in conjunction with the present invention.

FIG. 2A depicts the format of a typical instruction word which may be utilized in conjunction with the present invention. The instruction word shown in FIG. 2A comprises 18 digits each of which may comprise four bits organized in binary coded decimal format. The first two digits of the instruction denote a particular operation to be performed by the data processing system and the particular instruction denoted by the first digits of the instruction word shown in FIG. 2A may be considered to specify a "move-and-clear" operation. The next four digits of the instruction depicted as "N" digits, may be utilized to denote the number of words which are to be moved and cleared during the execution of the move-and-clear instruction. The next six digits, depicted as "A" digits, denote the address of the first word to be moved and the final six digits, depicted as "B" digits, represent the address into which the first word moved is to be relocated.

FIG. 3 depicts a schematic block diagram of an embodiment of the present invention utilizing instruction words of the format depicted in FIG. 2A. FIG. 3 depicts a portion of memory unit 10 and a portion of processor 17 or 18 of FIG. 1 wherein the data processing system of FIG. 1 has been modified in accordance with the present invention. Thus, FIG. 3 depicts core memory 26, memory address register 27, memory information register 28, read circuitry 29, write circuitry 30 and restoration circuitry 61, all of which are a part of memory unit 10, shown in FIG. 1.

During a single memory cycle of core memory 26, a word may be written into or read from memory 26. During a write operation, a word stored in information register 28 is written into the address identified in register 27 under the control of signals provided by write circuitry 30. During a read operation, a word located at an address identified in register 27 is read into information register 28 under the control of signals provided by read circuitry 29. During a read operation, the word stored at the address identified in register 27 is read into information register 28 during the "read time" of a memory cycle and is restored into the address identified in register 27 during the "write time" of the memory cycle by means of restoration circuitry 61. Restoration circuitry 61 may represent any circuitry well known in the art for accomplishing restoration into memory 26 of words read from memory 26.

Address register 31, address register 32, operation register 33, field length register 34, sequence control circuitry 35, countdown circuit 36 and count-up circuitry 37 and 38 shown in FIG. 3 may comprise a portion of processor 17 or 18, shown in FIG. 1. This portion of the process or is connected to the memory unit via switch interlock 24.

After an instruction word such as that shown in FIG. 2A has been fetched from memory according to well known fetch techniques, the first two digits of the instruction will be stored in operation register 33, the next four digits of the instruction will be stored in field length register 34, the next six digits of the instruction will be stored in address register 31 and the final six digits of the instruction will be stored in address register 32. Sequence control circuitry 35 is a central control unit which typically includes a clock pulse source and a sequence counter by means of which the sequence control unit is caused to step through a series of sequential steps in which output control lines designated by $S_0$ through $S_m$ are energized in a controlled sequence. Sequence control unit 35 also includes combinational gating circuitry which, in response to signals applied to unit 35, controls the sequence in which the output control lines are energized. Such sequence control units are well known in the computer and data processing art. Initially, the sequence control unit may be considered to be in the $S_0$ state.

Upon the completion of fetch of the move-and-clear instruction shown in FIG. 2A, the sequence control circuitry 35 is caused to advance to state $S_1$ in response to signals provided by the particular digits stored in operation register 33. During state $S_1$, the contents of address registers 31 are transferred to memory address register 27 via gate 50 and the word stored at the address now identified in register 27 is read from memory 26 and transferred to memory information register 28. The foregoing occurs during the "read time" of a memory cycle and in response to a $S_1$ signal applied from sequence control unit 35 to read circuitry 29. During the "write time" of this memory cycle the word stored in register 28 which normally is automatically restored into memory 26 by circuitry 61 is not so restored as a result of an $S_1$ signal from sequence control unit 35 applied to inhibit restoration circuitry 39. Inhibit restoration circuitry 39 may comprise gating circuitry which applies an inhibit signal to circuitry 61 thereby inhibiting restoration into memory 26 of words read from memory 26 whenever sequence control unit 35 is in the $S_1$ state. Just before the end of the $S_1$ state, signals from sequence control unit 35 cause countdown circuitry 36 to decrease by "one" the value stored in field length register 34 and to increase by "one" the value stored in address register 31. At the completion of the $S_1$ state, sequence control unit 35 advances to the $S_2$ state.

During the $S_2$ state, the address stored in register 32 is transferred to memory address register 27 via gate 51 and write circuitry 30 is energized to write the word stored in memory information register 28 into the address identified in register 27. Just prior to the end of the $S_2$ state, a signal from control unit 35 causes count-up circuitry 38 to increase by "one" the value stored in address register 32. Thus, at the end of the $S_2$ state a word which had been stored at a first particular address in memory 26 has been moved to a second particular address of memory 26 and, in response to the inhibiting of restoration circuitry 61, the first particular address in memory 26 has been cleared.

At the end of state $S_2$ the sequence control unit 35 returns to state $S_1$ if the value stored in field length register 34 is greater than zero. The operations previously discussed as occurring during state $S_1$ are then repeated, those discussed as occurring in state $S_2$ are repeated and sequence control unit 35 again reverts to state $S_1$ if the value stored in field length register 34 is still greater than zero. This cycle of operations continues until the value stored in field length register 34 is equal to zero. When at the end of an $S_2$ state the value stored in field length register 34 is zero, this indicates to sequence control unit 35 that execution of the move-and-clear command has been completed and that the next instruction may now be fetched.

It will be seen that, as a result of the move-and-clear command executed in accordance with the circuitry shown in FIG. 3, disadvantages previously noted as occurring during the operation of data processing systems having time-shared main memories are eliminated. Thus for example, the circuitry shown in FIG. 3 may be utilized by a processor to scan a number of addresses in core memory 26 where result descriptors may be stored. The first result descriptor address may be identified by the six "A" digits of the instruction shown in FIG. 2A and the address to which the first result descriptor word is moved may be identified by the six "B" digits of the instruction shown in FIG. 2A. The number of successive locations to be scanned may be designated by the four "N" digits of the instruction shown in FIG. 2A. The result descriptor words are moved from the scanned A addresses to the reserved B addresses where they may later be examined.

In previous systems as described above, it has been necessary following the removal of the result descriptor words from the A addresses to the B addresses, and the subsequent examination of these words while in the B addresses, to clear the A addresses by means of execution of a separate "clear" command. As a result, a danger is always present that a result descriptor will be stored in an A address following scan of that address but prior to the clearing of that address which follows the scan. When a result descriptor is so stored during that interval, it will be lost as a result of the clear operation. It may be seen that this danger is eliminated by means of the arrangement shown in FIG. 3 since the scan and clearing of each A address occur during the same memory cycle. Thus, no result descriptor can be stored in any A address between the time that address has been scanned and the time it is cleared.

The embodiment shown in FIG. 3 may also be utilized to move a record of input information after it has been written into an input area of memory 26 from a particular input unit. Such an input area must be large enough to accommodate the largest record of information which is expected. Many records of information transferred into the input area will be much shorter than this maximum record length. Subsequent to the receipt of such records into the input area, they are normally moved into other locations of memory 26. If these records are moved by means of ordinary move commands, each word moved to the new location is automatically restored into the input area as well. Since records of varying length are written into the input area, the input area must be cleared after each execution of a move command. Otherwise, an incoming short record may become intermixed with a previous longer record stored in the input area at the time the shorter record is transferred onto the input area. Execution of a clear command following each writing of a record into the input area necessitates a separate command to accomplish this function, the time required to fetch this command and the time required to execute this command. By means of the execution of a single move-and-clear command, as illustrated in FIG. 3, a separate clear command, and the time required for its fetch and execution may be eliminated.

Figure 2B:
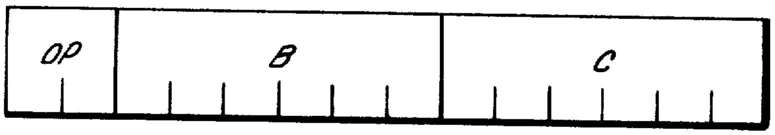
Figure 2C:
Figure 5:
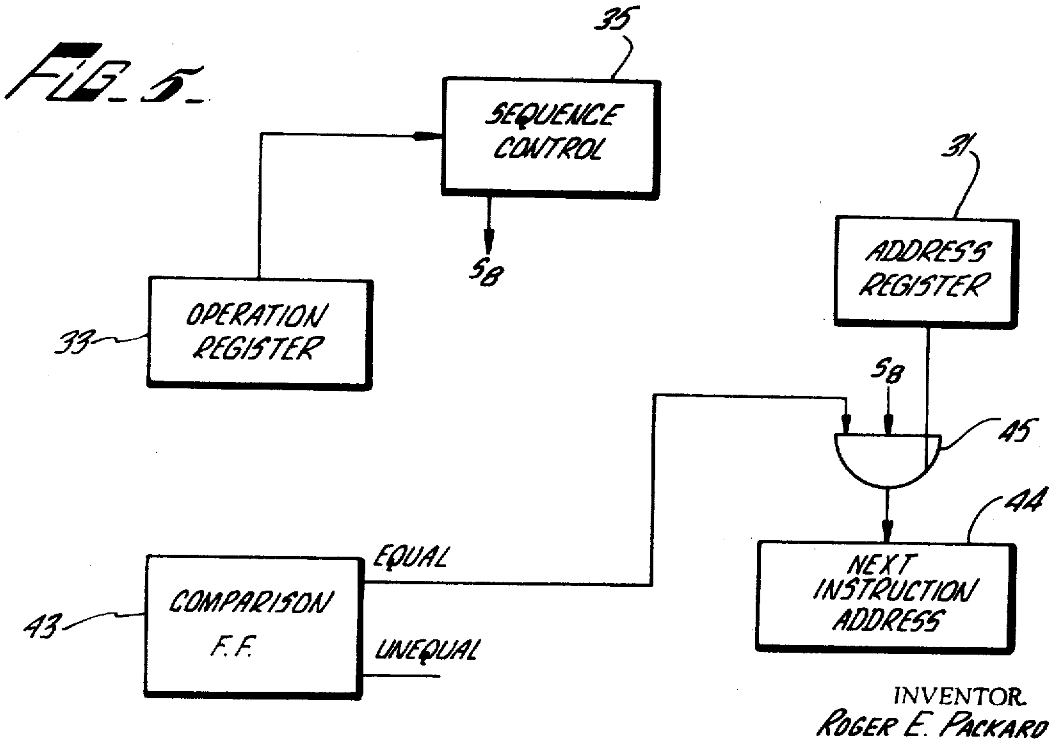
FIGS. 4 and 5 depict, together with FIG. 3, an embodiment of the present invention utilizing instruction words of the format depicted in FIGS. 2A, 2B and 2C.
Figure 2:
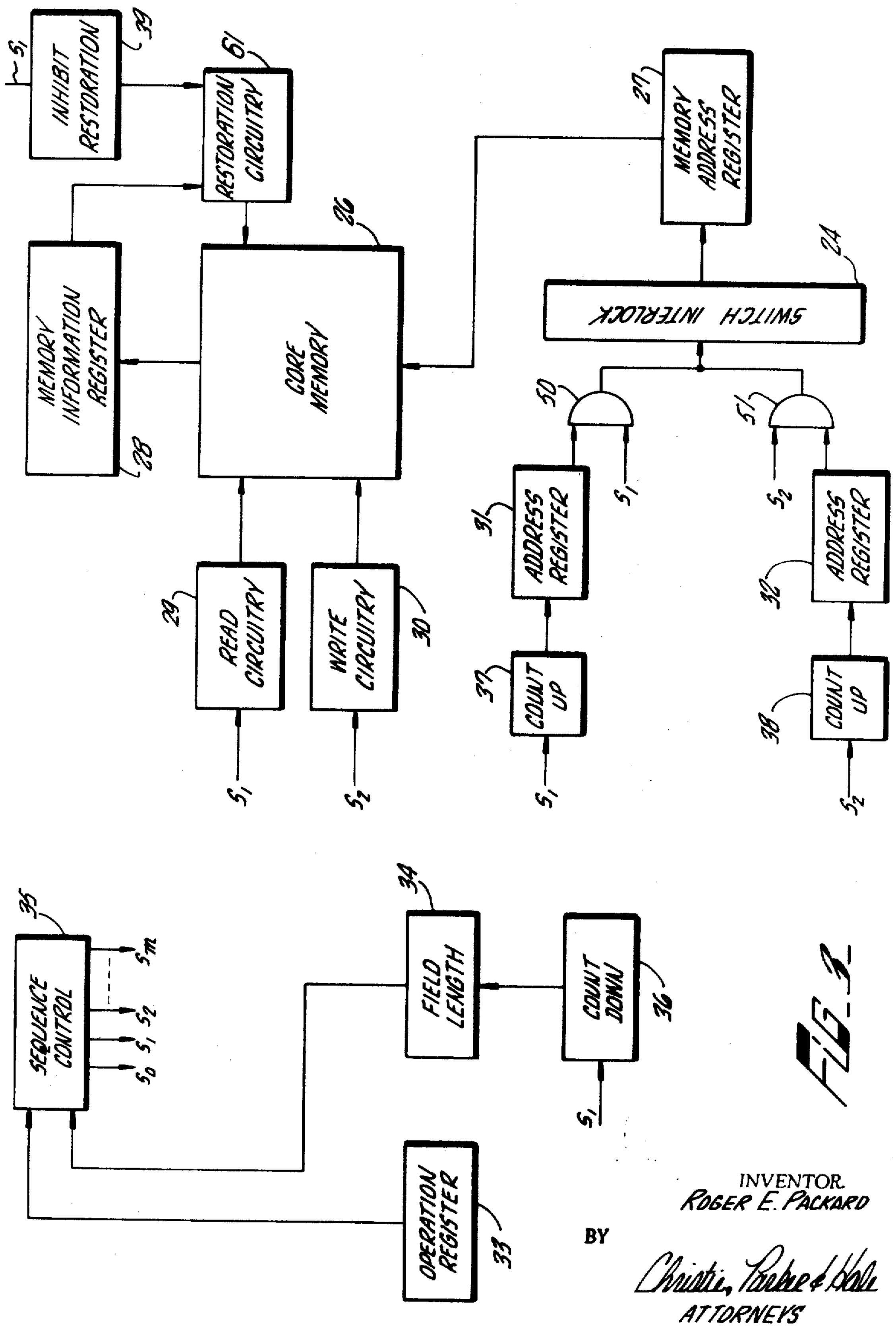
Figure 4:
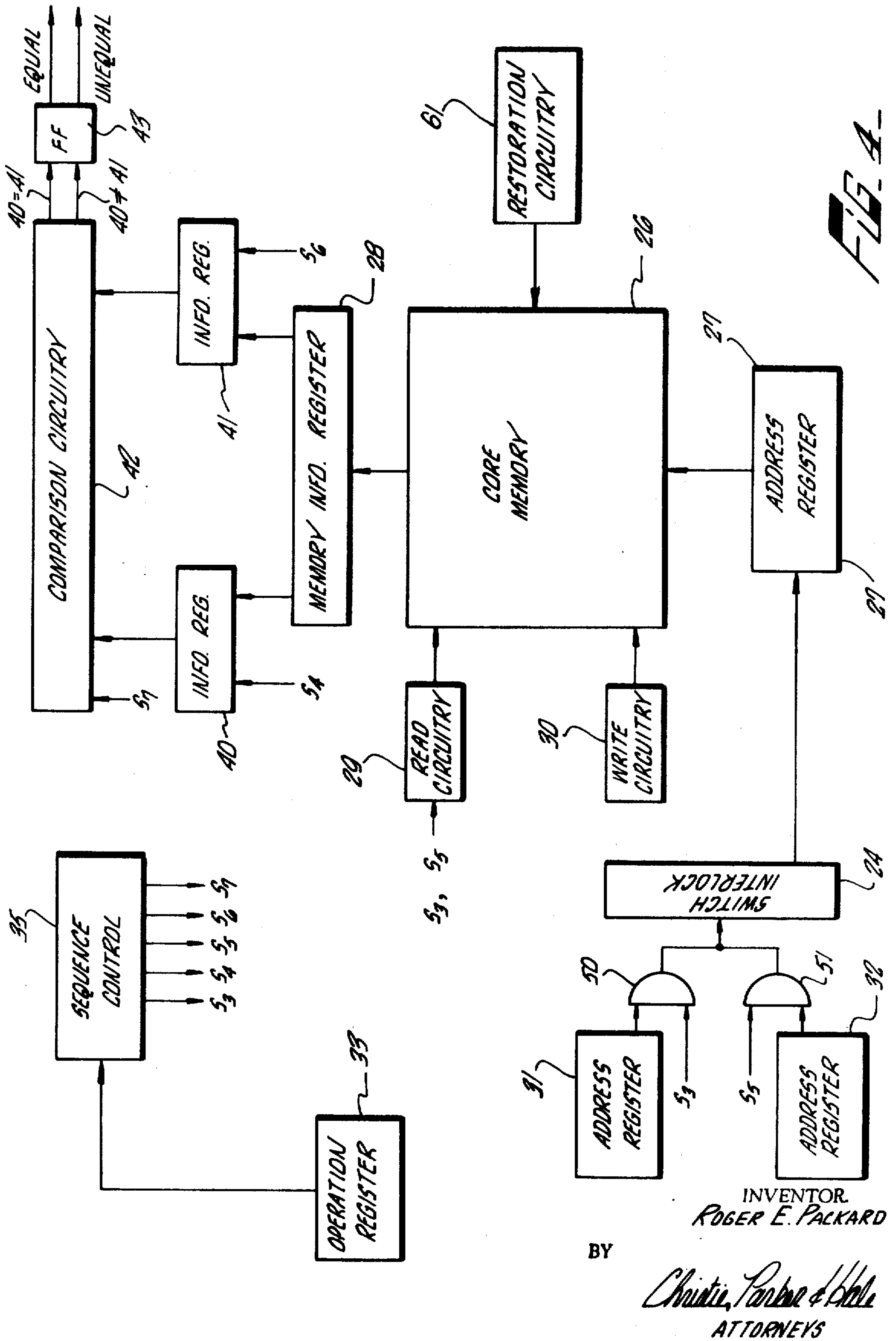

As discussed previously, serious problems may also arise in multi-processor data processing systems having time-shared main memories when more than one processor attempts to change a particular record stored in the main memory. FIGS. 4 and 5, together with FIG. 3, depict an embodiment of the present invention wherein these problems are eliminated. FIG. 4 depicts a number of the elements shown in FIG. 3. In addition, it depicts information register 40, information register 41, comparison circuitry 42 and flip-flop circuit 43. FIG. 5 depicts a number of elements also shown in FIGS. 3 and 4 and, in addition, depicts next instruction address register 44 and an AND gate 45. FIGS. 2B and 2C depict two additional instruction words which may be utilized in conjunction with an embodiment of the present invention shown in FIGS. 3, 4 and 5. FIG. 2B depicts a "compare" instruction word. Again the first two digits of this instruction word denote the instruction which is to be executed. The next 12 digits denote two addresses in memory 26 the contents of which are to be compared with each other. FIG. 2C depicts a "conditional branch" instruction. Again the first two digits of this instruction word denote the particular instruction to be executed in the next six digits denote the address of an instruction to which the processor is to branch if the specified condition is satisfied. FIG. 3 depicts the manner in which a data processing system may execute a "move-and-clear" operation. FIG. 4 depicts the manner in which it may execute the "compare" operation illustrated in FIG. 2B, and FIG. 5 depicts the manner in which it may execute the "conditional branch" instruction illustrated in FIG. 2C.

To avoid the problems arising when several processors attempt concurrently to change the same record stored in a main memory unit, each such competing processor is required to execute in sequence the three instructions shown in FIGS. 2A, 2B and 2C. The execution of the move-and-clear command will be as described previously in connection with the discussion of FIG. 3 with the modification that the field length will be set equal to "one." Thus, the cycle described previously will be performed only once. The A address of the instruction of FIG. 2A will be a predetermined flag-address of the particular record which the processor desires to change. The B address will be the address in memory 26 of a reserved location into which the word stored at the flag-address may be transferred. Upon the conclusion of the "move-and-clear" operation, the flag-address will be cleared as previously described in the discussion of the execution of this instruction. The cleared state of the word stored at the flag-address may be considered to represent a flag-value stored at this address. Thus, upon execution of the move-and-clear instruction by any of a number of processors desiring to change a particular record stored in memory 26, the processor will have placed the flag-value in the flag-address during the same memory cycle in which the contents of the flag-address are moved to a reserved address.

Subsequently, the processor will execute the "compare" instruction illustrated in FIG. 2B. The B address shown in the compare instruction of FIG. 2B is the same address as that of the reserved B address into which the contents of the flag-location were transferred. The C address of the instruction shown in FIG. 2B is the address of a word known to be in the cleared state. Execution of the "compare" instruction is shown in FIG. 4. Upon the fetch of this instruction, the two operation digits will be stored in register 33, digits manifesting the B address into which the contents of the flag-address have been transferred will be stored in address register 31, and digits manifesting the C address will be stored in address register 32.

Upon completion of the fetch of this instruction, sequence control unit 35 recognizes the digits stored in register 33 and advances to state $S_3$. During state $S_3$ the contents of register 31 are transferred to register 27 via gate 50 and the word identified by these contents is read from memory 26 into memory information register 28 under the control of signals provided by read circuitry 29. Restoration circuitry 61 subsequently restores the word read into register 28 back into memory 26. At the completion of state $S_3$ sequence control unit 35 advances to state $S_4$.

During state $S_4$, the contents of register 28 are transferred to information register 40. At the conclusion of state $S_4$ sequence control unit advances to state $S_5$ during which the contents of address register 32 are transferred into memory address register 27 via gate 51 and the word identified by these contents is read from memory 26 into memory information register 28 under the control of signals provided by read circuitry 29. Subsequently, the information transferred into register 28 is again restored into memory 26 via restoration circuitry 61. At the conclusion of state $S_5$ sequency control unit 35 advances to state $S_6$. During state $S_6$, the contents of information register 28 are transferred to information register 41. At the conclusion of state $S_6$ sequence control unit 35 advances to state $S_7$.

During state $S_7$, the contents of register 40 and register 41 are compared by means of comparison circuitry 42 and a signal is provided by circuitry 42 indicating whether the contents of registers 40 and 41 are equal or are unequal. This signal from circuitry 42 sets flip-flop circuitry 43 into one of its two states. One of the states of flip-flop 43 indicates that the contents of registers 40 and 41 are equal, while the other state of flip-flop 43 indicates that the contents of registers 40 and 41 are unequal.

Subsequent to the execution of the compare instruction of FIG. 2B, as illustrated by the operation described in conjunction with FIG. 4, the processor executes the branch instruction of FIG. 2C. Execution of the branch instruction by the processor is illustrated in FIG. 5. Upon completion of the fetch of this operation, the operation digits will be stored in operation register 33 and the address digits denoted E in FIG. 2C will be stored in address register 31. Subsequent to the fetch of this instruction, the sequence control unit 35 will recognize the operation digits stored in register 33 and will advance to state $S_8$.

During state $S_8$, the contents of register 31 are transferred to next instruction address register 44 via gate 45 only if comparison flip-flop circuit 43 indicates that the contents of the information registers 40 and 41 compared during the previous $S_7$ state were, in fact, equal. The contents thus transferred into register 44 represent the address of the "move-and-clear" instruction shown in FIG. 2A. The transfer of this address into register 44 notifies the processor that the flag-value had previously been stored in the flag-address of the record sought to be changed. As a result, the processor is alerted to the fact that another processor has previously gained access to this record for purposes of changing it. Consequently, the processor will again execute the move-and-clear instruction shown in FIG. 2A, will again execute the compare instruction of FIG. 2B and will again execute the branch instruction of FIG. 2C, as previously described. If, after the second execution of these instructions, the flip-flop circuit 43 again indicates that the contents of registers 40 and 41 were found to be equal during the execution of the compare command, this sequence of instructions will again be repeated. This cycle will, in fact, be repeated until the flip-flop 43 indicates during execution of the branch instruction that the contents of registers 40 and 41 compared during the previous compare instruction were, in fact, unequal. When this condition occurs, the processor is in this way notified that no other processor now has priority with respect to accessing the record sought to be changed and the processor may then proceed to make changes in this record. When the processor completes these changes it will remove the flag-value from the flag-address thereby making the record again accessible by other processors.

In summary, the processor in executing the move-and-clear instruction removes the contents of the flag address to a reserved location and inserts therein the flag-value, all during the same memory cycle. During subsequent execution of a compare instruction it determines whether the reserved location contains a flag-value previously stored in the flag-location by another processor. If it determines that the flag-value had been previously stored therein, it cannot at this time make changes in the record sought to be changed, since the other processor has priority. It then continues to execute the move-and-clear instruction and the compare instruction until that time when it determines that the contents of the flag-location are not equal to the flag-value. When this condition exists, execution of the branch instruction results in the branch not being taken. As a result, the processor continues to execute instructions in sequence and may, therefore, commence to change the contents of the record sought to be changed. Since the processor stores the flag-value in the flag-location during the same memory cycle in which it moves the contents of the flag-location to a reserved address for purposes of subsequent comparison, it is impossible for one processor to insert the flag-value in the flag-location subsequent to the removal of this word from this location by another processor but prior to the insertion of the flag-value in this address by the other processor. As a result, it is impossible for two processors both to determine concurrently that they may proceed to change the same record stored in memory 26.

What have been described are considered to be only illustrative embodiments of the present invention. Accordingly, it is to be understood that various and numerous other arrangements may be devised by one skilled in the art without departing from the spirit and scope of this invention.

What is claimed is:

1. In a data processing system having a time-shared main memory, the combination comprising:
- operation register means storing bits representative of an instruction to be exectued;
- first address register means storing bits representative a first address in main memory;
- second address register means storing bits representative of a second address in main memory;
- means for automatically restoring in main memory any word read from main memory;
- means for detecting the bits stored in the operation register means representative of a particular instruction; and
- means responsive to the detection of the particular instruction for reading from main memory the word stored at the first address, for writing the word into the second address of main memory, and for inhibiting restoration of the word into the first address of main memory.

2. In a data processing system having a time-shared memory unit and means for automatically restoring into the memory unit any word read from the memory unit, the combination comprising:
- an operation register storing bits representative of a move-and-clear instruction;
- a first address register storing bits representative of a first address in the memory unit;
- a second address register storing bits representative of a second address in the address unit;
- means for detecting the particular instruction represented by the bits stored in the operation register; and
- means responsive to the detection of the move-and-clear instruction for moving to the second address the word stored at the first address and for inhibiting restoration of the word into the first address.

3. In a data processing system having a time-shared main memory, the combination comprising:
- an operation register storing bits representative of an instruction to be executed;
- a first address register storing bits representative of a first address in main memory, the first address being the address of the first word of a record;
- a second address register storing bits representative of a second address in main memory;
- a field length register storing bits representative of the number of words in the record;
- means for automatically restoring in main memory during the write-time of a memory cycle any word read from main memory during the read-time of the memory cycle;

means for detecting bits stored in the operation register representative of a particular instruction and for providing a particular sequence of control signals in response to the detection of the particular instruction, the number of cycles of the particular sequence of control signals being controlled by the field length register and equal to the number of words in the record; and means responsive to the cycles of control signals for reading from main memory the record stored at addresses commencing with the first address, storing the record in main memory at addresses commencing with the first address, storing the record in main memory at addresses commencing with the second address, and inhibiting restoration of the record into the addresses commencing with the first address.

4. In a data processing system according to claim 3, the means responsive to the control signals comprising:

means operable during each cycle of control signals for reading from main memory the word stored at the address manifested by bits in the first address register;

means operable during each cycle of control signals for writing the word into the address manifested by bits in the second address register;

means operable during each cycle of control signals for inhibiting restoration of the word into the address from which it was read;

means operable during each cycle of control signals for increasing by a predetermined value the address manifested by bits in the first register;

means operable during each cycle of control signals for increasing by a predetermined value the address manifested by bits in the second register; and means operable during each cycle of control signals for decreasing by a predetermined value the value manifested by bits in the field length register.

5. A data processing system comprising:

a time-shared main memory;

a memory information register;

an operation register storing bits representative of a particular instruction to be executed;

a first address register storing bits representative of a first address in main memory, the first address being a flag-address of a record stored in main memory;

a second address register storing bits representative of a second address in main memory;

means for detecting the bits stored in the operation register representative of the particular instruction;

means responsive to the detection of the particular instruction for reading the word stored in the first address into the memory information register and, during the same memory cycle, for establishing a particular flag-value word in the first address;

means for writing the word stored in the memory information register into the second address; and means for subsequently determining if the word stored in the second address is equal to the flag-value.

6. A data processing system according to claim 5 further comprising:

a bistable element;

means for setting the bistable element to its first stable state in response to a determination that the word stored in the second address is equal to the flag-value and for setting it to its second stable state in response to a determination that the word stored in the second address is not equal to the flag-value;

a next instruction address register; and means responsive to the bistable element being in its first state for storing bits into the next instruction address register indicating that the record may not be operated upon and that the particular instruction should be repeated.

7. A data processing system according to claim 6 further comprising:

means for automatically restoring in main memory any word read from main memory;

the means responsive to the detection of the particular instruction inhibiting the automatic restoration of the word read from the first address, the cleared state of this address established as a result of the inhibition being equal to the flag-value.

8. In a multi-processor data processing system having a time-shared main memory, a method for preventing two processors from simultaneously operating upon the same record stored in main memory, comrising the following steps:

storing in a first register, bits representative of a flag address within a record stored in main memory;

storing in a second register bits representative of a reserved address in main memory;

reading the word stored at the flag address into a third register and, during the same memory cycle, establishing a particular flag-value word in main memory at the flag address;

writing the word stored in the third register into main memory at the reserve address; and subsequently generating a signal indicating if the word stored at the reserved address is the same as said particular flag-value word, the signal providing an indication to the processor whether or not it can operate on the record.

9. In a multi-processor data processing system having a time-shared main memory, the method of accessing a record stored in the main memory by any of the processors, comprising:

generating an address of a flag word location in the record in memory, generating an address of a location in memory reserved by the particular processor seeking to access the record in memory, transferring the contents of the flag word location to the reserved location and at the same time establishing a predetermined flag word at the flag word location, sensing if the word transferred to the reserved location is a flag word, and repeating each of the above steps if the word sensed in the reserved location is said flag word.

10. The method in claim 9 further comprising the steps of:

operating on the record if the word in the reserved location is not said flag word, and removing the flag word from the flag word location in the record on completion of the operation on the record by the particular processor.

References Cited

UNITED STATES PATENTS 3,200,380 8/1965 MacDonald et al. ---- 340—172.5

RAULFE B. ZACHE, Primary Examiner